United States Patent
Konishi

(10) Patent No.: US 10,065,432 B2
(45) Date of Patent: Sep. 4, 2018

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroto Konishi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/684,108

(22) Filed: Aug. 23, 2017

(65) Prior Publication Data

US 2018/0056669 A1   Mar. 1, 2018

(30) Foreign Application Priority Data

Aug. 30, 2016   (JP) .................. 2016-168601

(51) Int. Cl.
| | |
|---|---|
| *G03G 15/043* | (2006.01) |
| *B41J 2/47* | (2006.01) |
| *G03G 21/16* | (2006.01) |
| *H04N 1/00* | (2006.01) |

(52) U.S. Cl.
CPC .......... *B41J 2/473* (2013.01); *G03G 15/0435* (2013.01); *G03G 21/168* (2013.01); *G03G 21/1671* (2013.01); *G03G 21/1685* (2013.01); *G03G 2215/0122* (2013.01); *G03G 2215/0404* (2013.01); *H04N 1/00909* (2013.01)

(58) Field of Classification Search
CPC ... B41J 2/473; G03G 21/168; G03G 15/0435; G03G 21/1671; G03G 21/1685; G03G 2215/0122; G03G 2215/0404; H04N 1/00909
See application file for complete search history.

(56) References Cited

U.S. PATENT DOCUMENTS

| | | | | |
|---|---|---|---|---|
| 2006/0284968 | A1* | 12/2006 | Hayashi | .................. B41J 2/473 347/241 |
| 2007/0053040 | A1* | 3/2007 | Sakaue | .................. G02B 26/10 359/204.1 |

FOREIGN PATENT DOCUMENTS

JP   05-142489   6/1993

* cited by examiner

*Primary Examiner* — Yaovi M Ameh
(74) *Attorney, Agent, or Firm* — Wenderoth, Lind & Ponack, L.L.P.

(57) ABSTRACT

An optical scanning device includes a rotating polygon mirror, a light source that irradiates first and second light beams at one side of the rotating polygon mirror and irradiates third and fourth light beams at the other side thereof, a first optical element that reflects the first light beam and allows the second light beam to pass therethrough, a second optical element that reflects the second light beam, a third optical element that allows the third and fourth light beams to pass therethrough, and a fourth optical element that reflects the fourth light beam. The second light beam is a light beam corresponding to yellow, the first, the third, and the fourth light beams are light beams corresponding to three colors other than the yellow. Between the third and fourth optical elements, a scanning lens is arranged. Between the first and second optical elements, a scanning lens is not arranged.

8 Claims, 4 Drawing Sheets

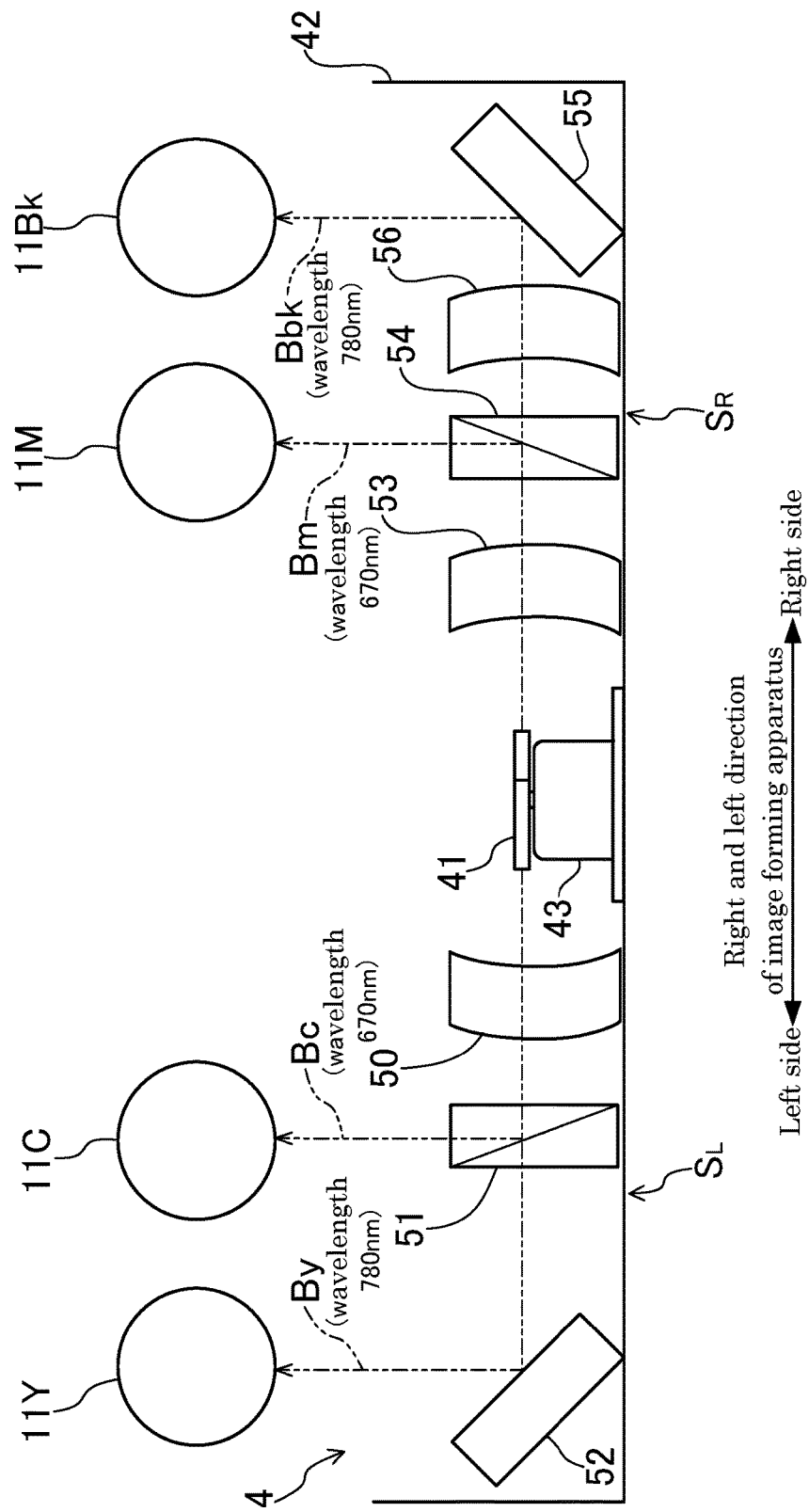

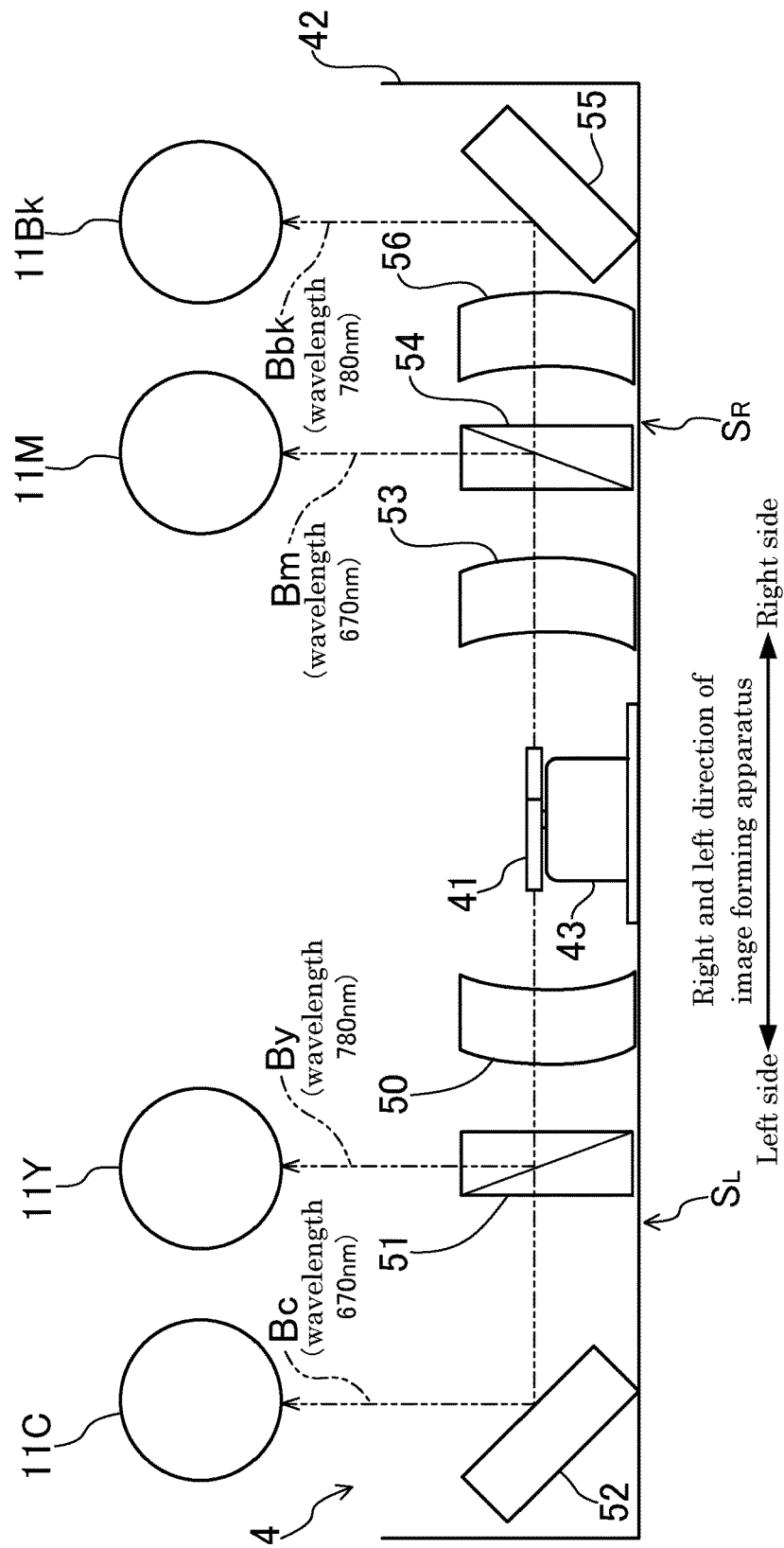

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2016-168601 filed on Aug. 30, 2016, the entire contents of which are incorporated herein by reference.

BACKGROUND

The technology of the present disclosure relates to an optical scanning device and an image forming apparatus including the same.

There has been known an opposed scanning type optical scanning device provided with a light source that irradiates a first light beam and a second light beam toward a rotating polygon mirror at one side of the rotating polygon mirror, and irradiates a third light beam and a fourth light beam toward the rotating polygon mirror at the other side thereof. The first to fourth light beams correspond to yellow, magenta, cyan, and black, respectively. The first to fourth light beams are deflected and scanned by the rotating polygon mirror and then are lead to a surface (a surface to be scanned) of an image carrying member corresponding to each color.

In this type of optical scanning device, there is a case in which the rotating polygon mirror is arranged at a plurality of stages in an axis direction in order to facilitate separation of the four light beams deflected and scanned by the rotating polygon mirror. However, in this case, there is a problem that a space for arranging the rotating polygon mirror increases and costs also increase.

In this regard, there has been proposed an optical scanning device capable of configuring the rotating polygon mirror with one stage and separating four light beams from one another. In this optical scanning device, the wavelengths of a first light beam and a second light beam become different from each other and the wavelengths of a third light beam and a fourth light beam also become different from each other. At one side of the rotating polygon mirror, a first optical element is arranged to reflect the first light beam toward a first surface to be scanned and allows the second light beam to pass therethrough, and at a radially outside of the first optical element, a second optical element is arranged to reflect the second light beam, which has passed through the first optical element, toward a second surface to be scanned. At the other side of the rotating polygon mirror, a third optical element is arranged to reflect the third light beam toward a third surface to be scanned and allows the fourth light beam to pass therethrough, and at a radially outside of the third optical element, a fourth optical element is arranged to reflect the fourth light beam, which has passed through the third optical element, toward a fourth surface to be scanned.

SUMMARY

An optical scanning device according to one aspect of the present disclosure includes a rotating polygon mirror, a light source, a first optical element, a second optical element, a third optical element, and a fourth optical element. The light source irradiates a first light beam and a second light beam, which has a wavelength different from a wavelength of the first light beam, toward the rotating polygon mirror at one side of the rotating polygon mirror, and irradiates a third light beam and a fourth light beam, which has a wavelength different from a wavelength of the third light beam, toward the aforementioned rotating polygon mirror at the other side of the rotating polygon mirror. The first optical element is provided at the one side of the rotating polygon mirror, reflects the first light beam deflected and scanned by the rotating polygon mirror toward a first surface to be scanned, and allows the second light beam to pass therethrough. The second optical element is provided radially outside the first optical element and reflects the second light beam having passed through the first optical element toward a second surface to be scanned. The third optical element is provided at the other side of the rotating polygon mirror, reflects the third light beam deflected and scanned by the rotating polygon mirror toward a third surface to be scanned, and allows the fourth light beam to pass therethrough. The fourth optical element is provided radially outside the third optical element and reflects the fourth light beam having passed through the third optical element toward a fourth surface to be scanned.

The aforementioned second light beam is a light beam corresponding to yellow among four colors of the yellow, magenta, cyan, and black, the first light beam, the third light beam, and the fourth light beam are light beams corresponding to three colors other than the yellow among the four colors, and wavelengths of the aforementioned first light beam and third light beam are equal to each other. Furthermore, between the third optical element and the fourth optical element, a scanning lens is arranged. The scanning lens corrects an optical diameter of the fourth light beam directed to the fourth optical element after passing through the third optical element so as to be equal to an optical diameter of the third light beam directed to the third surface to be scanned after being reflected by the third optical element. Between the aforementioned first optical element and second optical element, a scanning lens for correcting an optical diameter of the second light beam having passed through the first optical element and corresponding to the yellow is not arranged.

An optical scanning device according to another aspect of the present disclosure includes a rotating polygon mirror, a light source, a first optical element, a second optical element, a third optical element, and a fourth optical element. The light source irradiates a first light beam and a second light beam, which has a wavelength different from a wavelength of the first light beam, toward the rotating polygon mirror at one side of the rotating polygon mirror, and irradiates a third light beam and a fourth light beam, which has a wavelength different from a wavelength of the third light beam, toward the aforementioned rotating polygon mirror at the other side of the rotating polygon mirror. The first optical element is provided at the one side of the rotating polygon mirror, reflects the first light beam deflected and scanned by the rotating polygon mirror toward a first surface to be scanned, and allows the second light beam to pass therethrough. The second optical element is provided radially outside the first optical element and reflects the second light beam having passed through the first optical element toward a second surface to be scanned. The third optical element is provided at the other side of the rotating polygon mirror, reflects the third light beam deflected and scanned by the rotating polygon mirror toward a third surface to be scanned, and allows the fourth light beam to pass therethrough. The fourth optical element is provided radially outside the third optical element and reflects the fourth light beam having passed through the third optical element toward a fourth surface to be scanned.

The aforementioned first light beam is a light beam corresponding to yellow among four colors of the yellow, magenta, cyan, and black, the second to fourth light beams are light beams corresponding to three colors other than the yellow among the four colors, and wavelengths of the aforementioned second light beam and third light beam are equal to each other. Furthermore, between the aforementioned third optical element and fourth optical element, a scanning lens is arranged. The scanning lens corrects an optical diameter of the fourth light beam directed to the fourth optical element after passing through the third optical element so as to be equal to an optical diameter of the third light beam directed to the aforementioned third surface to be scanned after being reflected by the third optical element. Between the aforementioned first optical element and second optical element, a scanning lens for correcting an optical diameter of the aforementioned first light beam having passed through the first optical element and corresponding to the yellow is not arranged.

BRIEF DESCRIPTION OF THE DRAWINGS

FIG. 3 is a view viewed from the arrow direction of III of FIG. 2.

FIG. 4 is a view corresponding to FIG. 3, which illustrates an embodiment 2.

DETAILED DESCRIPTION

Hereinafter, an example of an embodiment will be described in detail on the basis of the drawings. It is noted that the technology of the present disclosure is not limited to the following embodiments.

Embodiment 1

Figure 1:
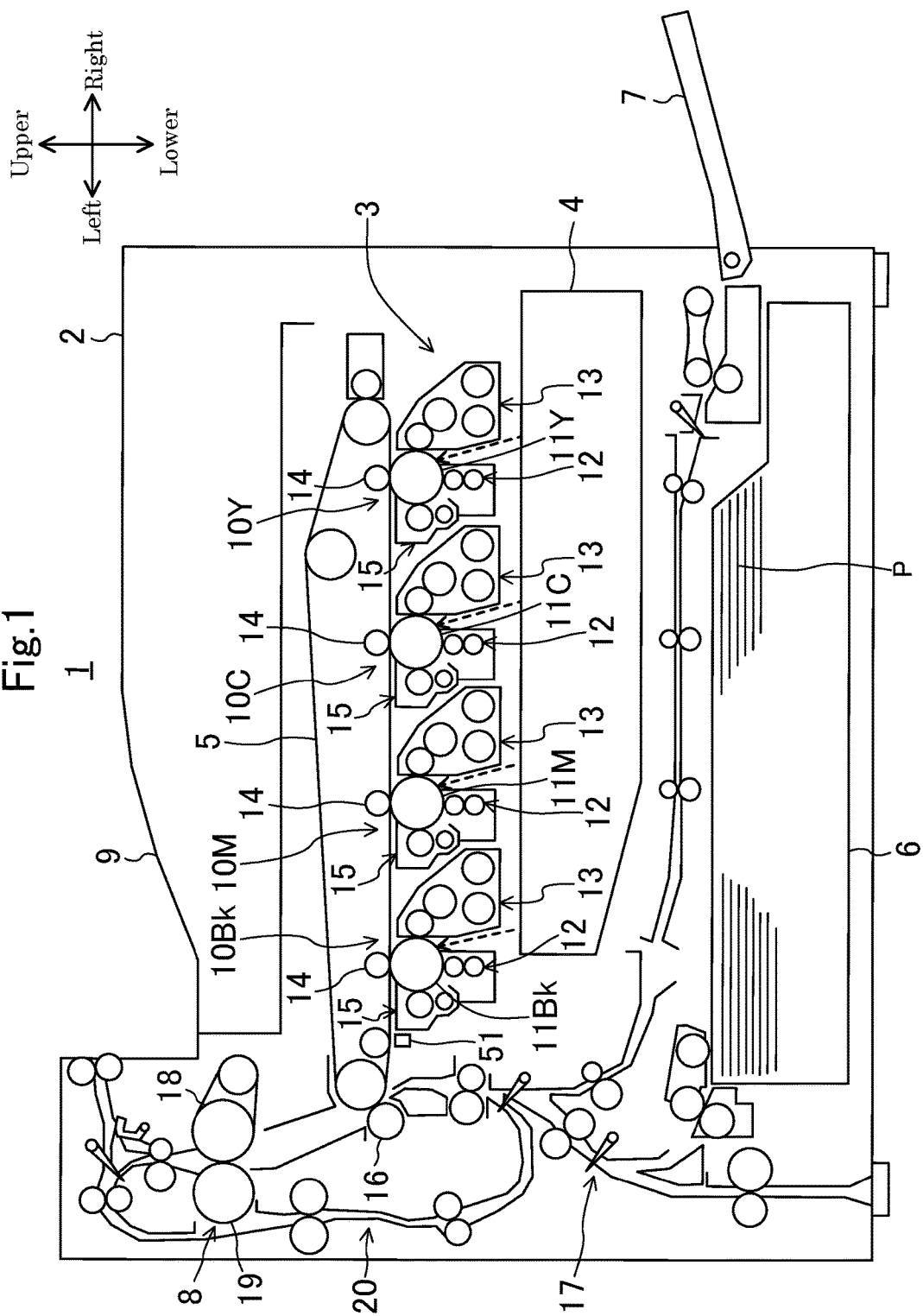
FIG. 1 is a schematic configuration diagram illustrating an image forming apparatus provided with an optical scanning device in an embodiment 1.

FIG. 1 illustrates a schematic configuration diagram of an image forming apparatus 1 in an embodiment 1. The image forming apparatus 1 is a tandem type color printer and includes an image forming unit 3 in a box-like casing 2. The image forming unit 3 transfers an image to a recording sheet P and forms the image on the recording sheet P on the basis of image data transmitted from an external device such as a computer subjected to network connection and the like. In the following description, a front side and a rear side indicate a front side and a rear side (a front side and a back side in a direction vertical to the sheet surface of FIG. 1) of the image forming apparatus 1, and a left side and a right side indicate a left side and a right side when the image forming apparatus 1 is viewed from the front side.

Below the image forming unit 3, an opposed scanning type optical scanning device 4 is arranged to irradiate light beams (laser lights), and above the image forming unit 3, an intermediate transfer belt 5 is arranged. Below the optical scanning device 4, a sheet storage unit 6 is arranged to store the recording sheet P, and at the right side of the sheet storage unit 6, a manual sheet feeding unit 7 is arranged. At a lateral upper part of the intermediate transfer belt 5, a fixing unit 8 is arranged to perform a fixing process on the image transferred to and formed on the recording sheet P. A reference numeral 9 indicates a sheet discharge unit arranged at an upper portion of the casing 2 to discharge the recording sheet P subjected to the fixing process in the fixing unit 8.

The image forming unit 3 includes four image forming units 10Bk, 10M, 10C, and 10Y arranged in a row along the intermediate transfer belt 5. These image forming units 10Bk, 10M, 10C, and 10Y form toner images of black, magenta, cyan, and yellow, respectively. Specifically, the image forming units 10Bk, 10M, 10C, and 10Y have photosensitive drums 11Bk, 11M, 11C, and 11Y, respectively. Directly under each of the photosensitive drums 11Bk, 11M, 11C, and 11Y, a charging device 12 is arranged, and at one side of each of the photosensitive drums 11Bk, 11M, 11C, a developing device 13 is arranged. Directly above each of the photosensitive drums 11Bk, 11M, 11C, and 11Y, a primary transfer roller 14 is arranged, and at a left side of each of the photosensitive drums 11Bk, 11M, 11C, and 11Y, a cleaning unit 15 is arranged to clean the peripheral surface of each of the photosensitive drums 11Bk, 11M, 11C, and 11Y.

The peripheral surface of each of the photosensitive drums 11Bk, 11M, 11C, and 11Y is uniformly charged by the charging device 12, and laser light corresponding to each color component based on the image data inputted from the aforementioned computer and the like is irradiated to the charged peripheral surface of each of the photosensitive drums 11Bk, 11M, 11C, and 11Y from the optical scanning device 4, so that an electrostatic latent image is formed on the peripheral surface of each of the photosensitive drums 11Bk, 11M, 11C, and 11Y. A developer is supplied to the electrostatic latent image from the developing device 13, so that a toner image of black, magenta, cyan, or yellow is formed on the peripheral surface of each of the photosensitive drums 11Bk, 11M, 11C, and 11Y. These toner images are superposed on and transferred to a lower surface of the intermediate transfer belt 5 by a transfer bias applied to the primary transfer roller 14.

A reference numeral 16 indicates a secondary transfer roller arranged below the fixing unit 8 in the state of abutting the intermediate transfer belt 5, the recording sheet P conveyed along a sheet conveyance path 17 from the sheet storage unit 6 or the manual sheet feeding unit 7 is interposed between the secondary transfer roller 16 and the intermediate transfer belt 5, and the toner images on the intermediate transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be heated and pressed, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

Figure 2:
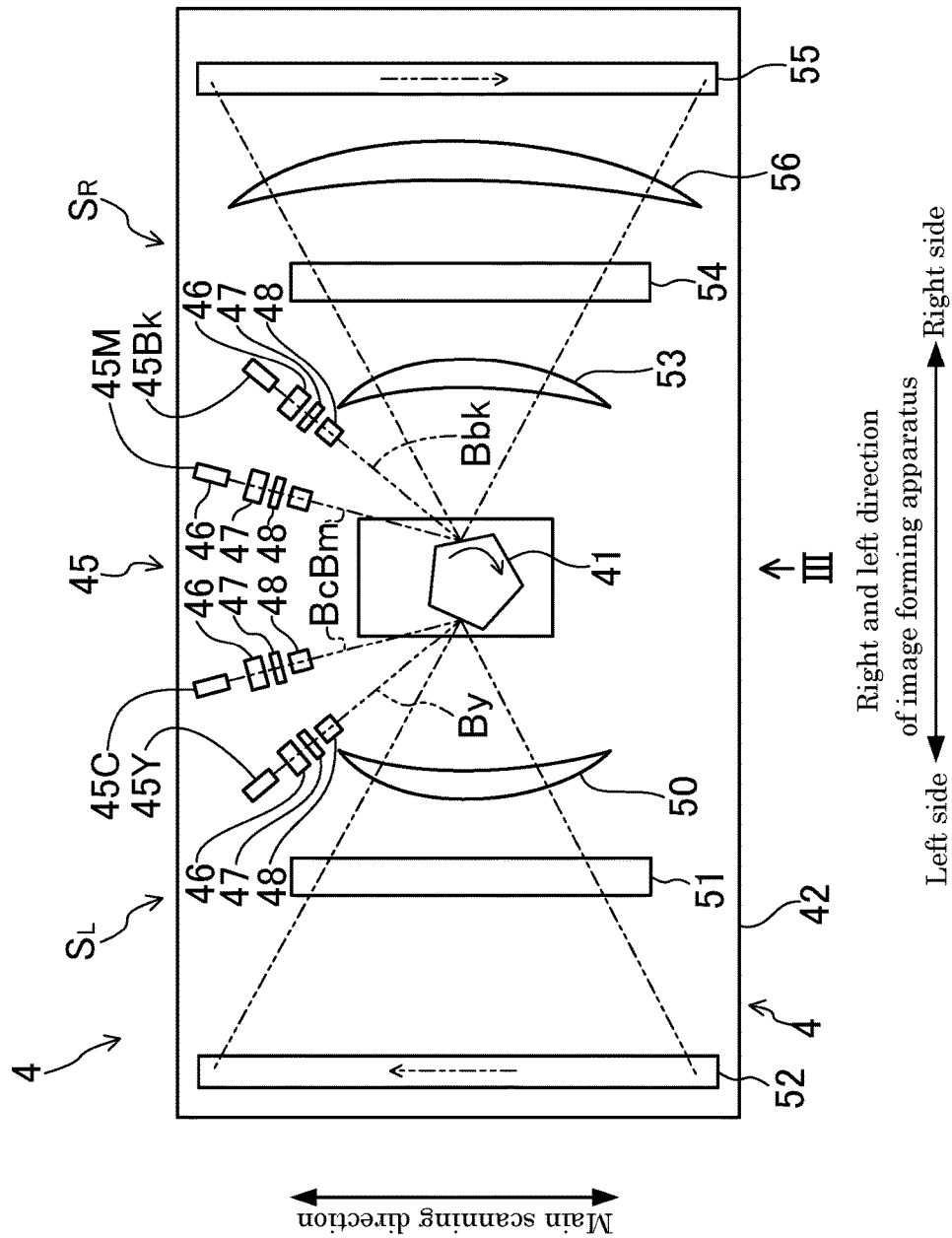
FIG. 2 is a schematic plan view illustrating an optical scanning device.

Next, details of the aforementioned optical scanning device 4 will be described. FIG. 2 is a plan view illustrating an internal structure of the optical scanning device 4, and FIG. 3 is a view viewed from the arrow direction of III of FIG. 2. The optical scanning device 4 has a housing 42 for receiving a polygon mirror (a rotating polygon mirror) 41 therein. The housing 42 is opened upward and an upper side of the housing 42 is closed by a lid member (not illustrated).

The polygon mirror 41 is supported by a polygon motor 43 at a center portion of a lower wall part of the housing 42. The polygon mirror 41 is formed in an equilateral pentagonal pillar shape having five reflective surfaces at a side surface thereof. The polygon mirror 41 is fixed to a distal end portion of a driving shaft of the polygon motor 43. The polygon mirror 41 is rotationally driven by the polygon motor 43 at a predetermined speed, so that light beams emitted from a light source 45 are reflected and then are deflected and scanned.

The light source 45 has four laser light sources 45Bk, 45M, 45C, and 45Y corresponding to four colors of black, magenta, cyan, and yellow. Each of the laser light sources 45Bk, 45M, 45C, and 45Y is fixed to a sidewall part of the housing 42.

Among the four laser light sources 45Bk, 45M, 45C, and 45Y, the laser light sources 45Y and 45C corresponding to the yellow and the cyan are arranged at a left side (one side) of a straight line passing through a rotating axis and extending in a main scanning direction when viewed from the rotating axis direction of the polygon mirror 41, and the laser light sources 45M and 45Bk corresponding to the black and the magenta are arranged at a right side (the other side) of the straight line.

Wavelengths of laser beams Bc and Bm emitted from the light sources 45C and 45M corresponding to the cyan and the magenta are 670 nm, and wavelengths of laser beams By and Bbk emitted from the light sources 45Y and 45Bk corresponding to the yellow and the black are 780 nm. Between the laser light sources 45Bk, 45M, 45C, and 45Y and the polygon mirror 41, a collimator lens 46, an aperture 47, and a cylindrical lens 48 are sequentially arranged in an optical path direction.

At both right and left sides of the polygon mirror 41 at the lower wall part of the housing 42, scanning optical systems $S_L$ and $S_R$ are provided to form images of the light beams Bbk, Bm, Bc, and By reflected by the polygon mirror 41 on the surfaces of the photosensitive drums 11Bk, 11M, 11C, and 11Y.

The left scanning optical system $S_L$ is an optical system through which the light beams Bc and By corresponding to the cyan and the yellow deflected and scanned by the polygon mirror 41 pass.

Specifically, the left scanning optical system $S_L$ has a scanning lens 50, a dichroic mirror (a first optical element) 51, and a return mirror (a second optical element) 52.

The scanning lens 50 is a long fθlens extending in the main scanning direction at the left side of the polygon mirror 41. The scanning lens 50 converts the light beams Bc and By corresponding to the cyan and the yellow deflected and scanned by the polygon mirror 41 from an equiangular motion to a uniform motion.

The dichroic mirror 51 is arranged radially outside the scanning lens 50 while being spaced apart from the scanning lens 50 when viewed from the axis direction of the polygon mirror 41. The dichroic mirror 51 reflects the light beam (a first light beam) Bc corresponding to the cyan of the light beam Bc and beam By having passed through the scanning lens 50 and corresponding to the cyan and the yellow, leads the light beam Bc to the surface (a first surface to be scanned) of the photosensitive drum 11C, and allows the light beam (a second light beam) By having a wavelength longer than that of the light beam Bc and corresponding to the yellow to pass therethrough. By so doing, the light beam Bc corresponding to the cyan corresponds to the first light beam and the light beam By corresponding to the yellow corresponds to the second light beam.

The return mirror 52 is a rectangular plate-shaped reflection mirror extending in the main scanning direction, and is arranged radially outside the dichroic mirror 51 while being spaced apart from the dichroic mirror 51 when viewed from the axis direction of the polygon mirror 41. The return mirror 52 reflects the light beam By having passed through the dichroic mirror 51 and corresponding to the yellow, and leads the light beam By to the surface (a second surface to be scanned) of the photosensitive drum 11Y.

The right scanning optical system $S_R$ is an optical system through which the light beams Bm and Bbk corresponding to the magenta and the black deflected and scanned by the polygon mirror 41 pass. The basic configuration of the right scanning optical system $S_R$ is similar to that of the left scanning optical system $S_L$, but is different from the left scanning optical system $S_L$ in that two scanning lenses 53 and 56 are provided.

Specifically, the right scanning optical system $S_R$ has the two scanning lenses 53 and 56, a dichroic mirror (a third optical element) 54, and a return mirror (a fourth optical element) 55.

The scanning lens 53 is a long fθlens extending in the main scanning direction at the right side of the polygon mirror 41. The scanning lens 53 converts the light beams Bm and Bbk corresponding to the magenta and the black deflected and scanned by the polygon mirror 41 from an equiangular motion to a uniform motion.

The dichroic mirror 54 is arranged radially outside the scanning lens 53 while being spaced apart from the scanning lens 53 when viewed from the axis direction of the polygon mirror 41. The dichroic mirror 54 reflects the light beam Bm corresponding to the magenta of the light beam Bm and the light beam Bbk having passed through the scanning lens 53 and corresponding to the magenta and the black, leads the light beam Bm to the surface (a third surface to be scanned) of the photosensitive drum 11M, and allows the light beam Bbk having a wavelength longer than that of the light beam Bm and corresponding to the black to pass therethrough. By so doing, the light beam Bm corresponding to the magenta corresponds to the third light beam and the light beam corresponding to the black corresponds to the fourth light beam.

The return mirror 55 is a rectangular plate-shaped reflection mirror extending in the main scanning direction, and is arranged radially outside the dichroic mirror 54 while being spaced apart from the dichroic mirror 54 when viewed from the axis direction of the polygon mirror 41. The return mirror 55 reflects the light beam Bbk having passed through the dichroic mirror 54 and corresponding to the black, and leads the light beam Bbk to the surface (a fourth surface to be scanned) of the photosensitive drum 11Bk.

The scanning lens 56 is a long fθlens extending in the main scanning direction between the dichroic mirror 54 and the return mirror 55. The scanning lens 56 of the present embodiment has power (refractive power) in both of the main scanning direction and the sub-scanning direction. The scanning lens 56 corrects an optical diameter of the light beam Bbk having passed through the dichroic mirror 54 and corresponding to the black so as to be equal to an optical diameter of the light beam Bm reflected by the dichroic mirror and directed to the photosensitive drum 11M. The same diameter includes the case in which an optical diameter difference, for example, is within 10 μm as well as the case in which the optical diameters completely coincided with each other.

In the optical scanning device 4 of the present embodiment, since the wavelengths of the light beam Bc corresponding to the cyan and the light beam Bm corresponding to the magenta are equal to each other (670 nm), the optical diameters of both light beams Bc and Bm on the surfaces of the photosensitive drums 11C and 11M become equal to each other. The light beam (the fourth light beam) Bbk corresponding to the black has a wavelength different from those of both light beams Bc and Bm, but its optical diameter is corrected when passing through the scanning lens 56, so that the optical diameter of the light beam Bbk on the surface of the photosensitive drums 11Bk becomes equal to those of the light beams Bc and Bm corresponding to the cyan and the magenta. On the other hand, since the light beam By corresponding to the yellow has a wavelength different from those of the light beams Bc and Bm corresponding to the cyan and the magenta and no scanning lens for optical path correction is provided on its optical path, the optical diameter of the light beam By on the surface of the photosensitive drums 11Y becomes different from those of the light beams Bc, Bm, and Bbk corresponding to the other three colors. Therefore, since thicknesses of a line of the yellow and lines of the other three colors (the magenta, the black, and the cyan) of the printed image become different from each other, image failure may occur.

However, since the yellow is less conspicuous than the other three colors when viewed with the naked eye, it is less probable that a user will be aware of image failure of the printed image. In the present embodiment, a scanning lens for optical path correction is not provided between the dichroic mirror 51 and the return mirror 52 with respect to the light beam By corresponding to the yellow while focusing on the fact that the yellow is less conspicuous with the naked eye, so that image degradation of a printed image due to difference in wavelengths of light beams can be suppressed to the extent that a user is not able to recognize the image degradation without increasing the number of scanning lenses for optical path correction as much as possible. Thus, it is possible to improve image quality of the printed image when viewed from user's eyes while suppressing an increase in the costs of the optical scanning device 4.

Furthermore, in the present embodiment, two types of light beams having wavelengths of 670 nm and 780 nm are used. Consequently, the standards of the dichroic mirrors 51 and 54 provided to the left and right scanning optical systems $S_L$ and $S_R$ and having a wavelength separation function can be allowed to be equal to each other. Thus, it is possible to reduce product costs as compared with the case of using different standards of dichroic mirrors 51 and 54.

Embodiment 2

FIG. 4 is a view corresponding to FIG. 3, which illustrates an embodiment 2. In the present embodiment, since the wavelength separation specifications of the dichroic mirror 51 included in the left scanning optical system $S_L$ are different from those of the aforementioned embodiment 1, the arrangements of the photosensitive drums 11Y and 11C corresponding to the yellow and the cyan are laterally reversed. Since the configuration of the right scanning optical system $S_R$ is similar to that of the aforementioned embodiment 1, a detailed description thereof will be omitted.

The dichroic mirror 51 of the left scanning optical system $S_L$ is different from that of the aforementioned embodiment 1, and is configured to reflect the light beam By corresponding to the yellow toward the photosensitive drum 11Y and to allow the light beam Bc having a wavelength shorter than that of the light beam By and corresponding to the cyan to pass therethrough. The light beam Bc having passed through the dichroic mirror 51 and corresponding to the cyan is reflected by the return mirror 52 and is led to the surface of the photosensitive drum 11C. Furthermore, in the present embodiment, the light beam By corresponding to the yellow corresponds to the first light beam and the light beam Bc corresponding to the cyan corresponds to the second light beam. The configuration of the right scanning optical system $S_R$ is similar to that of the aforementioned embodiment 1, the light beam Bm corresponding to the magenta corresponds to the third light beam, and the light beam Bbk corresponding to the black corresponds to the fourth light beam.

According to the optical scanning device 4 of the present embodiment, the optical diameter of the light beam By corresponding to the yellow becomes different from those of the light beams Bc, Bm, and Bbk corresponding to the other three colors. As described above, since the yellow is less conspicuous than the other three colors when viewed with the naked eye, it is less probable that a user will be aware of image failure of a printed image. Consequently, similarly to the aforementioned embodiment 1, image degradation of the printed image due to difference in wavelengths of light beams can be suppressed to the extent that a user is not able to recognize the image degradation without increasing the number of scanning lenses for optical path correction as much as possible. Thus, it is possible to improve image quality of the printed image when viewed from user's eyes while suppressing an increase in the costs of the optical scanning device 4.

What is claimed is:
1. An optical scanning device comprising:
a rotating polygon mirror;
a light source that irradiates a first light beam and a second light beam which has a wavelength different from a wavelength of the first light beam toward the rotating polygon mirror at one side of the rotating polygon mirror, and irradiates a third light beam and a fourth light beam which has a wavelength different from a wavelength of the third light beam toward the rotating polygon mirror at a remaining side of the rotating polygon mirror;
a first optical element that is provided at the one side of the rotating polygon mirror, reflects the first light beam deflected and scanned by the rotating polygon mirror toward a first surface to be scanned, and allows the second light beam to pass therethrough;
a second optical element that is provided radially outside the first optical element and reflects the second light beam having passed through the first optical element toward a second surface to be scanned;
a third optical element that is provided at the remaining side of the rotating polygon mirror, reflects the third light beam deflected and scanned by the rotating polygon mirror toward a third surface to be scanned, and allows the fourth light beam to pass therethrough; and
a fourth optical element that is provided radially outside the third optical element and reflects the fourth light beam having passed through the third optical element toward a fourth surface to be scanned,
wherein the second light beam is a light beam corresponding to yellow among four colors of the yellow, magenta, cyan, and black,
the first light beam, the third light beam, and the fourth light beam are light beams corresponding to three colors other than the yellow among the four colors, wavelengths of the first light beam and the third light beam are equal to each other, between the third optical element and the fourth optical element, a scanning lens is arranged to correct an optical diameter of the fourth light beam directed to the fourth optical element after passing through the third optical element so as to be equal to an optical diameter of the third light beam directed to the third surface to be scanned after being reflected by the third optical element, and between the first optical element and the second optical element, a scanning lens for correcting an optical diameter of the second light beam having passed through the first optical element and corresponding to the yellow is not arranged.

2. The optical scanning device of claim 1, wherein wavelengths of the first to fourth light beams are set to any one of two types of wavelengths having sizes different from each other.

3. The optical scanning device of claim 1, wherein the first optical element and the third optical element include dichroic mirrors.

4. An image forming apparatus including the optical scanning device of claim 1.

5. An optical scanning device comprising:
a rotating polygon mirror;
a light source that irradiates a first light beam and a second light beam which has a wavelength different from a wavelength of the first light beam toward the rotating polygon mirror at one side of the rotating polygon mirror, and irradiates a third light beam and a fourth light beam which has a wavelength different from a wavelength of the third light beam toward the rotating polygon mirror at a remaining side of the rotating polygon mirror;
a first optical element that is provided at the one side of the rotating polygon mirror, reflects the first light beam deflected and scanned by the rotating polygon mirror toward a first surface to be scanned, and allows the second light beam to pass therethrough;
a second optical element that is provided radially outside the first optical element and reflects the second light beam having passed through the first optical element toward a second surface to be scanned;
a third optical element that is provided at the remaining side of the rotating polygon mirror, reflects the third light beam deflected and scanned by the rotating polygon mirror toward a third surface to be scanned, and allows the fourth light beam to pass therethrough; and
a fourth optical element that is provided radially outside the third optical element and reflects the fourth light beam having passed through the third optical element toward a fourth surface to be scanned,
wherein the first light beam is a light beam corresponding to yellow among four colors of the yellow, magenta, cyan, and black,
the second to fourth light beams are light beams corresponding to three colors other than the yellow among the four colors,
wavelengths of the second light beam and the third light beam are equal to each other,
between the third optical element and the fourth optical element, a scanning lens is arranged to correct an optical diameter of the fourth light beam directed to the fourth optical element after passing through the third optical element so as to be equal to an optical diameter of the third light beam directed to the third surface to be scanned after being reflected by the third optical element, and
between the first optical element and the second optical element, a scanning lens for correcting an optical diameter of the first light beam having passed through the first optical element and corresponding to the yellow is not arranged.

6. The optical scanning device of claim 5, wherein wavelengths of the first to fourth light beams are set to any one of two types of wavelengths having sizes different from each other.

7. The optical scanning device of claim 5, wherein the first optical element and the third optical element include dichroic mirrors.

8. An image forming apparatus including the optical scanning device of claim 5.

* * * * *